United States Patent [19]

Laturell

[11] Patent Number: 5,280,526

[45] Date of Patent: Jan. 18, 1994

[54] TRANSFORMER-LESS HYBRID CIRCUIT

[75] Inventor: Donald R. Laturell, Tampa, Fla.

[73] Assignee: AT&T Bell Laboratories, Murray Hill, N.J.

[21] Appl. No.: 888,075

[22] Filed: May 26, 1992

[51] Int. Cl.$^5$ .......................................... H04M 19/00
[52] U.S. Cl. ..................... 379/405; 379/348; 379/344; 379/395
[58] Field of Search ............... 379/405, 395, 345, 342, 379/344, 377, 348, 402, 403

[56] References Cited

U.S. PATENT DOCUMENTS

| | | | |
|---|---|---|---|
| 4,056,719 | 11/1977 | Waaben | 379/344 |
| 4,113,996 | 9/1978 | Sanderson | 379/405 |
| 4,142,075 | 2/1979 | Olchewski | 379/405 |
| 4,192,978 | 3/1980 | Vincent | 379/405 |
| 4,203,012 | 5/1980 | Boxall | 379/405 |
| 4,278,847 | 7/1981 | Wortman | 379/395 |
| 4,491,700 | 1/1985 | Tahara | 379/405 |
| 4,567,331 | 1/1986 | Martin | 379/405 |

Primary Examiner—James L. Dwyer
Assistant Examiner—Jacques M. Saint-Surin
Attorney, Agent, or Firm—Henry T. Brendzel

[57] ABSTRACT

An improved transformer-less electronic isolating transformer is obtained with an output subcircuit that outputs a controlled current rather than voltage. Specifically, the improved hybrid comprises an output drive subcircuit that receives an ac signal and creates a corresponding current that is passed to the line that supports two way communication. The subcircuit not only converts the applied voltage to current but includes means for effecting gain. Signals arriving to the hybrid from the line are applied directly to a near-end echo circuit that is also responsive to the signal applied to the output drive subcircuit. Both the input of the output drive subcircuit and the output of the near-end echo subcircuit are isolated with opto-isolators that employ photodiodes in their photo-voltaic mode.

11 Claims, 2 Drawing Sheets

TRANSFORMER-LESS HYBRID CIRCUIT

BACKGROUND OF THE INVENTION

This invention relates to telephone hybrids, which are used to separate signals that flow over a line in both directions into component uni-directional signals.

FIG. 1 depicts the basic prior art arrangement for realizing a transformer-less hybrid circuit as gleaned, for example, from U.S. Pat. No. 4,056,719 issued Nov. 1, 1977 and assigned to the assignee of this invention. FIG. 1 depicts a central office driver 20 that is connected to customer apparatus 10 via impedance 21, which impedance represents the wire resistance from the customer apparatus to the central office. The customer apparatus signal that is destined to the central office is developed by driver 30, which is connected to the central office line (and impedance 21) via resistor 31. The side of resistor 31 that is closer to amplifier 30 is connected to the negative input of amplifier 40 through resistor 32 and the other side of resistor 31 is connected to the positive input of amplifier 40. The output of amplifier 40 is fed back to the negative input of amplifier 40 via resistor 33.

The signal across resistor 31 is a combination of the current induced by driver 30 and by driver 20. It can be shown, however, when $R_{33}R_{32} = R_{32}R_{21}$, the output of amplifier 40 is equal to the output of driver 20, thus developing a signal that is devoid of the driver 30 signal. Although the FIG. 1 circuit eliminates the contribution of driver 30 from the output of amplifier 40 (this contribution is often called the "near end echo") it is also known that a portion of the signal of driver 30 that travels to driver 20 reflects off driver 20 because of an impedance mismatch and returns to the customer's apparatus. This portion, which is often called the "far end echo" can not be readily distinguished from the true output of driver 20 and cannot be easily removed from the output of amplifier 40. Far-end echoes can be canceled, however, with an echo canceler that follows amplifier 40 and which trains on the particular characteristic of the signal path from driver 20 to amplifier 40. It appropriately subtracts from the signal arriving from amplifier 40 a filtered portion of the driver 30 output signal.

Echo cancelers are linear circuits, however, and therefore, nonlinearities that are introduced into the far end echo by the transformer cannot be canceled out.

In applications where ground isolation of the central office from the customer equipment is desired, a single isolator can be inserted between resistor 31 and the central office line. As mentioned above, however, any nonlinearities that are introduced by such an isolator cannot be eliminated by the action of resistor 31 and cannot be eliminated by echo cancelers. To overcome this problem, the aforementioned U.S. Pat. No. 4,056,719 discloses a transformer-less arrangement which employs opto-isolators in both paths. In particular, one opto-isolator is placed prior to driver 30 and the other opto-isolator is placed following amplifier 40. That means, of course, that the power supply voltages used to operate driver 30 and amplifier 40 have a common ground with driver 20.

Two problems arise in this arrangement. First, the power supply for driver 30 and amplifier 40 must be developed from the signal arriving at the customer apparatus via impedance 21. Since any dc current drawn for the purpose of powering elements 30 and 40 also causes a voltage drop across impedance 21, there is a limitation on the maximum dc power supply that can usefully be created for elements 30 and 40. In turn, a limitation of the dc supply that powers driver 30 limits the voltage excursions at the output of amplifier 30. The second problem with the FIG. 1 arrangement is that the power transferred to the central office from driver 30 is further limited by the power lost in resistor 31.

SUMMARY OF THE INVENTION

The described deficiencies of prior art transformer-less hybrids are overcome with an output subcircuit that delivers a controlled current rather than voltage and that current is applied directly to the line that supports two way communication. Specifically, the hybrid comprises an output drive subcircuit that receives an ac signal and creates a corresponding current that is passed to the line that supports two way communication. The subcircuit not only converts the applied voltage to current but includes means for effecting ac gain irrespective of the level of the dc supply.

The current source at the output drive subcircuit forms a high impedance for the signals arriving from the line, and those signals are applied directly to a near-end echo suppression subcircuit that is also responsive to the signal applied to the output drive subcircuit.

Additional improvements are attained by isolating the input of the output drive subcircuit and the output of the near-end echo suppression subcircuit with opto-isolators that employ photodiodes in their photo-voltaic mode.

DETAILED DESCRIPTION

Figure 1:
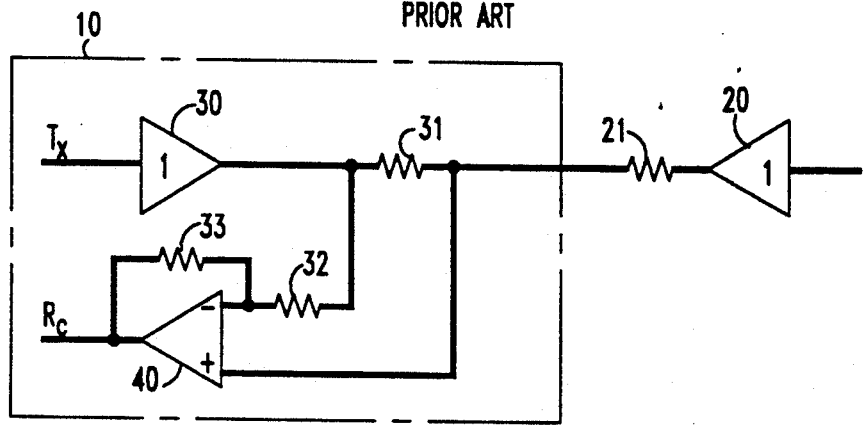
FIG. 1 depicts a prior art electronic hybrid circuit.
Figure 2:
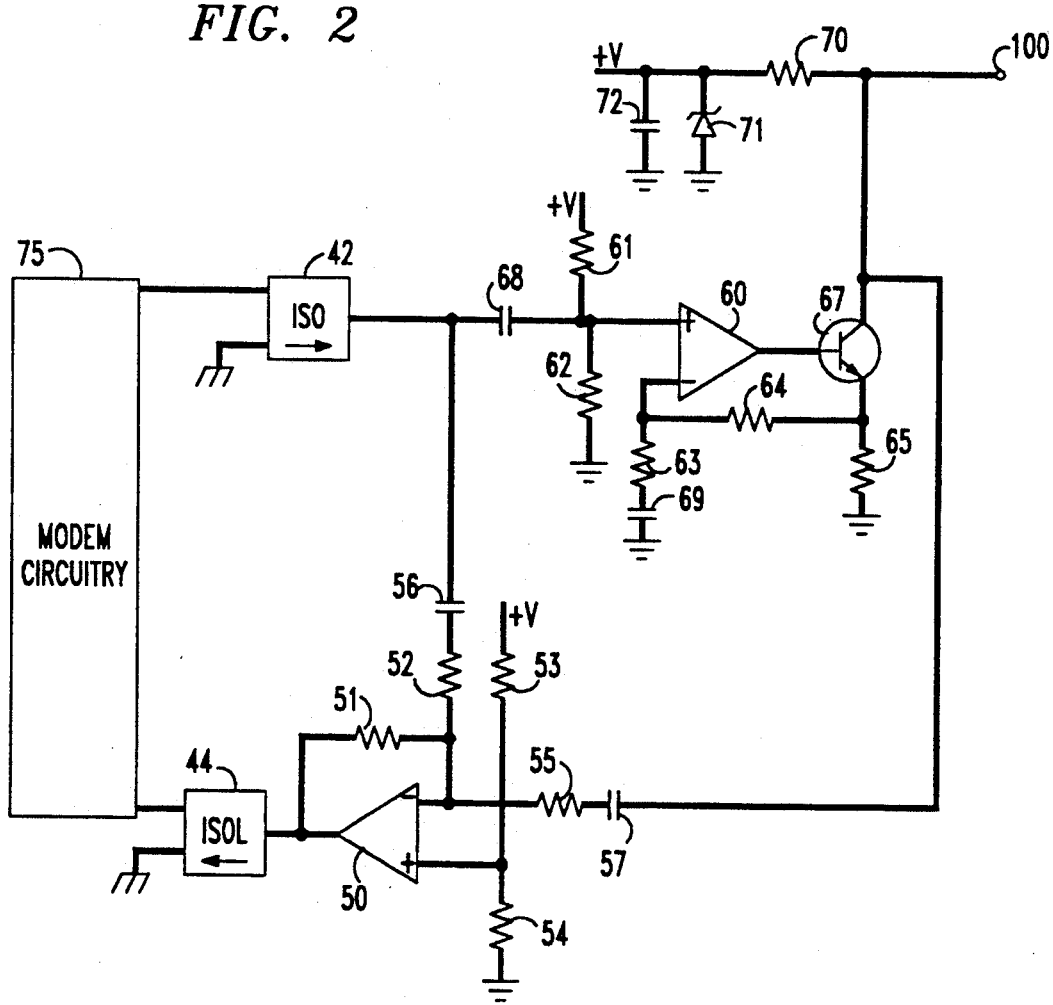
FIG. 2 depicts a transformer-less ground-isolating hybrid circuit that offers a powerful output current drive capability by employing a current sink circuit having independent ac gain control, while achieving a high degree of linearity by the use of opto-isolators between the electronic hybrid and the remainder of the customer apparatus.

FIG. 2 presents an improved transformer-less hybrid circuit that overcomes the above-described deficiencies of the FIG. 1 circuit. It generates a dc power source for itself from the energy supplied by driver 20 and includes an output subcircuit that develops an ac output voltage that is larger (peak-to-peak) than the generated dc power source. More specifically, FIG. 2 includes five subcircuits: a transmitter isolation stage 42; a receiver isolation stage 44; a near-end echo cancelling subcircuit comprising differential amplifier 50, resistors 51-55, and capacitors 56-57; an output driver subcircuit comprising differential amplifier 60, transistor 67, resistors 61-65 and capacitors 68 and 69; and power supply subcircuit comprising resistor 70, zener diode 71 and capacitor 72.

The Power Supply Subcircuit

The two-wire port of the FIG. 2 circuit (that communicates with the distant party) is between terminal 100 and the distant party's ground. The signal at terminal 100 includes a dc component and an ac component. When the distant party is a telephone central office, the dc output impedance of the FIG. 2 circuit at terminal 100 should be low enough to draw a sufficient current from driver 20 so that the central office would recognize the FIG. 2 circuit as being "off-hook". Consequentially, there is a required threshold below which the current must not fall. That implies that impedance 21 must be lower than some maximum level and that, in turn, means that a dc voltage can be maintained at terminal 100. It turns out that the dc component of the voltage at terminal 100 is fact sufficiently high to serve as the dc power source for electronic circuitry.

Of course, the signal at terminal 100 (relative to the central office ground) includes a non-dc component and that must be filtered out in order to create a dc power source. In FIG. 2, the dc power source is realized with resistor 70 connected to a parallel combination comprising zener diode 71 and capacitor 72. Resistor 70 and zener diode 71 combine to stabilize the dc voltage at the zener level, and capacitor 72 filters out all ac components.

Output Driver Subcircuit

The signal applied to the output driver subcircuit is isolated (from dc standpoint) with capacitor 68 and applied to the positive input of amplifier 60. The dc level of that positive input is controlled by resistors 61 and 62. Amplifier 60 derives its dc power source from capacitor 72. The output of amplifier 60 is applied to the base input of transistor 67, whose emitter is connected to ground via resistor 65. The current flowing through resistor 65 is, therefore, a function of its resistance and the voltage output of amplifier 60 (to a first degree of approximation). The emitter of transistor 67 is connected to ground also through a series connection comprising resistors 64, 63 and capacitor 69. For the frequencies of interest, capacitor 69 is essentially a short circuit. The dc potential at the junction point between resistors 64 and 63 is the same as the dc potential of the emitter of transistor 67 (since no dc current flows through switch 64). On the other hand, the ac potential at the junction point between resistors 64 and 63 is proportional to the ratio of the impedance presented by resistor 63 divided by the impedance presented by the sum of resistors 63 and 64, i.e., $R_{63}/(R_{63}+R_{64})$. That junction is connected to the negative input of amplifier 60. This connection causes the output voltage at the emitter of transistor 67 to have a dc component that is equal to the dc bias imposed on the positive input of amplifier 60 by resistors 61 and 62, and an ac component that is $(R_{63}+R_{64})/R_{63}$ times the ac signal at the positive input of amplifier 60, i.e., there is an achieved ac gain. The current flowing in the collector of transistor 67 and, therefore, in the signal path leading to driver 20 is the amplified ac voltage at the emitter of transistor 67, divided by the value of resistor 65. Of course, it would not be desirable to impose a gain that will completely saturate, or turn off, transistor 67.

It is noted that the above-described output driver circuit overcomes the deficiencies of the prior art in that the ac signal current is not limited by the dc voltage developed for driver 30. It is only limited by the power source at the central office and the magnitude of the line impedance (21). Moreover, no power loss needs to be suffered only to effect the hybrid function of eliminating the near-end echo (as is the case in the FIG. 1 circuit).

Near-end Echo Canceling Subcircuit

The near-end echo canceling subcircuit comprises amplifier 50 whose negative input is responsive to the signal applied to the output drive circuit via resistor 52 (decoupled by capacitor 56), to the collector output signal of transistor 67 via resistor 55 (decoupled by capacitor 67), and to the output of differential amplifier 50 via resistor 51. The positive input of amplifier 50 is impressed with a dc bias controlled by resistors 53 and 54. It can be shown that when $R_{55}=AR_{52}$, where A is the voltage gain between the output of circuit 42 and the collector of transistor 67, then the ac output of amplifier 50 is $-(R_{51}/R_{55})kV_{20}$, where $V_{20}$ is the voltage of driver 20 (with the far-end echo included) and k is a constant that relates to the fraction of driver 20 signal that appears at the collector of transistor 67 (i.e., $k=R_{70}/(R_{70}+R_{21})$). The dc output of amplifier 50 is equal to the dc bias at its positive input.

Isolation Subcircuits

Figure 3:
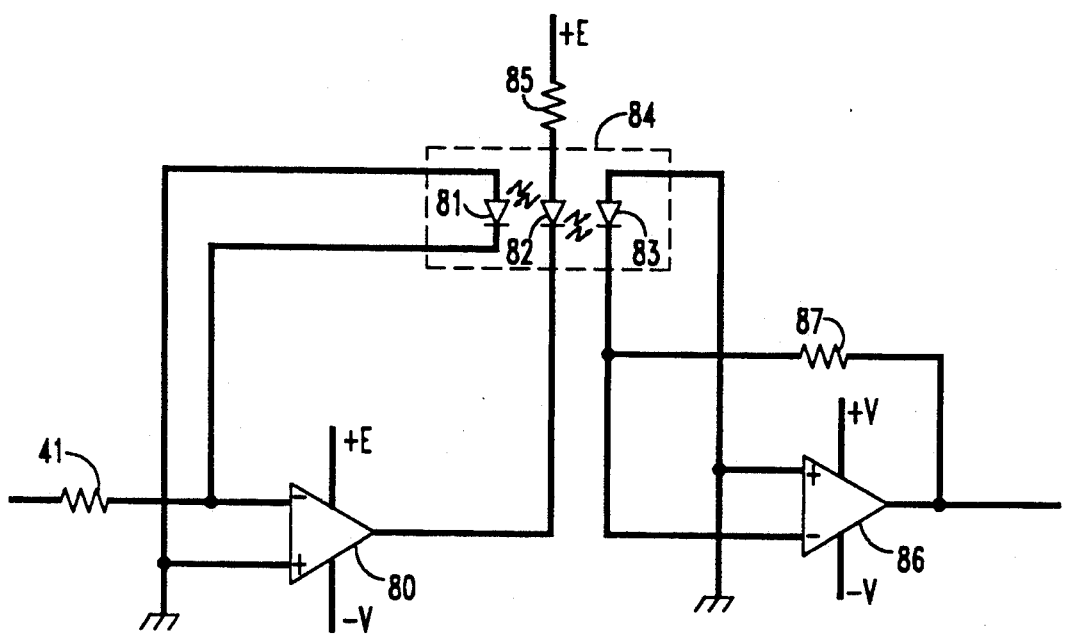
FIG. 3 is the schematic diagram of the opto-isolator circuits.

Isolation circuits 42 and 44 can be identical. In this embodiment, both are opto-isolators that employ an LED and two photodiodes as depicted in FIG. 3. They connect the improved hybrid to the remaining circuitry, 75, of a modem. The input signal to the opto-isolator is coupled to the negative input of amplifier 80 through R41. A photodiode 81 is connected between the negative input of amplifier 80 and its positive input with the anode connected to the positive input and the cathode connected to the negative input. The output of amplifier 80 is connected to the light emitting diode (LED) 82 that is connected to a positive potential through resistor 85.

Photodiode 81 comprises one element of opto-isolator device 84 which includes another photodiode (83) and light-emitting LED 82. Element 84 is similar to a commercial device that may be purchased, for example, from Burr-Brown (ISO 100). This element is designed for LED 82 to apply the same light intensity to the two photodiodes and the photodiodes are designed to closely match each other in their characteristics.

Photodiode 83 is connected to amplifier 86 in a similar manner that photodiode 81 is connected to amplifier 80; that is, with the cathode connected to the negative input and the anode connected to the positive input. A resistor 87 connects the output of amplifier 86 to the negative input of the amplifier.

In operation, when the circuit is at equilibrium, the output of amplifier 80 is near zero volts and LED 82 is active and imparting a stream of photons to photodiode 81. In response thereto, photodiode 81 effectively becomes a voltage source with an internal impedance (both of which are a non-linear function of the light intensity impinging the photodiode). The voltage across the photodiode, which is also the voltage across the positive and negative inputs of differential amplifier 80 is essentially zero. That means that the current flow through the photodiode's internal impedance going from the applied input signal through resistor 41 (see FIG. 2) creates a potential difference across that internal resistance that is essentially equal to the voltage generated by the photodiode. Altering the input signal alters the current through the photodiode's internal impedance, that creates a potential difference between the two inputs of differential amplifier 80, and that alters the amplifier's output in the direction of modifying the current through LED 82 which, in turn, alters the voltage generated at photodiode 81. A new balance point is thereby achieved.

The operational state of photodiode 83 is essentially identical to that of photodiode 81 due to the design of element 84. Consequently, the output of amplifier 86 faithfully reproduces the input signal (if $R_{41}$ equals $R_{87}$).

I claim:

1. A transformer-less hybrid circuit comprising;
    first means for deriving a dc operating power source from a signal applied to a first port of said hybrid by a distant communication means;
    second means, powered by said dc operating power source, for receiving an inbound signal transmitted to said hybrid by said distant communication means, to develop a received signal; and
    third means, powered by said dc operating power source for applying a current to said distant communication means in proportion to an applied outbound signal.

2. The hybrid circuit of claim 1 wherein said third means applies a current to said distant communication means substantially independent of the impedance through which said distant communication means is connected to said first port.

3. The hybrid circuit of claim 1 wherein said third means includes a current controlled output stage that delivers a dc current that is controlled independently of a delivered ac current.

4. The hybrid circuit of claim 1 wherein said third means includes a current source output stage that delivers a dc current that is controlled independently of a delivered ac current.

5. The hybrid circuit of claim 1 wherein said third means includes a transistor having its collector connected to the first port, where the dc current flowing through the transistor is controlled by the transistor's base dc voltage and a resistor between the transistor's emitter and a ground of the distant communication means, and the ac current flowing through the transistor is controlled by ac feedback means coupled to the transistor's emitter.

6. The hybrid circuit of claim 1 wherein the third means is adapted to develop an ac voltage at the first port that is larger (peak to peak) than the dc operating power source.

7. The hybrid circuit of claim 1 further comprising
    an isolation circuit for applying said outbound signal, from a transmit port, to said third means, while isolating a local ground associated with the outbound signal from the ground of the distant communication means, and
    an isolation circuit for coupling the inbound signal received by said second means to a receive port, while isolating the local ground associated with the receive port from the ground of the distant communication means.

8. The hybrid circuit of claim 7 wherein said isolation circuits are opto-isolation circuits.

9. The hybrid circuit of claim 8 wherein the opto-isolation circuits contain photo-diodes and the photo-diodes are operated in a photo-voltaic mode.

10. The hybrid circuit of claim 8 wherein the opto-isolation circuits contain photo-diodes and the photo-diodes are operated with essentially zero volts across them.

11. A modem including a transformer-less hybrid circuit comprising;
    first means for deriving a dc operating power source from a signal applied to a first port of said hybrid by a distant communication means;
    second means, powered by said dc operating power source, for receiving an inbound signal transmitted to said hybrid by said distant communication means, to develop a received signal; and
    third means, powered by said dc operating power source for applying a current to said distant communication means in proportion to an applied outbound signal.

* * * * *

REEXAMINATION CERTIFICATE (4325th)

United States Patent
Laturell

(10) Number: US 5,280,526 C1
(45) Certificate Issued: May 1, 2001

(54) TRANSFORMER-LESS HYBRID CIRCUIT

(75) Inventor: Donald R. Laturell, Tampa, FL (US)

(73) Assignee: Paradyne Corporation, North Largo, FL (US)

Reexamination Request:
No. 90/004,120, Jan. 29, 1996

Reexamination Certificate for:
Patent No.: 5,280,526
Issued: Jan. 18, 1994
Appl. No.: 07/888,075
Filed: May 26, 1992

(51) Int. Cl.$^7$ .................................................. H04M 19/00
(52) U.S. Cl. .......................... 379/405; 379/348; 379/344; 379/395
(58) Field of Search ............................... 379/405, 348, 379/344, 395, 345, 342, 377, 402, 403

(56) References Cited

U.S. PATENT DOCUMENTS 5,245,654    9/1993    Wilkison et al. .................. 379/405

OTHER PUBLICATIONS

B. Krause, Designing Linear Amplifiers Using the IL300 Optocoupler, Appnote 50, Siemens Corporation (Mar. 1991).

Primary Examiner—Wing F. Chan

(57) ABSTRACT

An improved transformer-less electronic isolating transformer is obtained with an output subcircuit that outputs a controlled current rather than voltage. Specifically, the improved hybrid comprises an output drive subcircuit that receives an ac signal and creates a corresponding current that is passed to the line that supports two way communication. The subcircuit not only converts the applied voltage to current but includes means for effecting gain. Signals arriving to the hybrid from the line are applied directly to a near-end echo circuit that is also responsive to the signal applied to the output drive subcircuit. Both the input of the output drive subcircuit and the output of the near-end echo subcircuit are isolated with opto-isolators that employ photodiodes in their photo-voltaic mode.

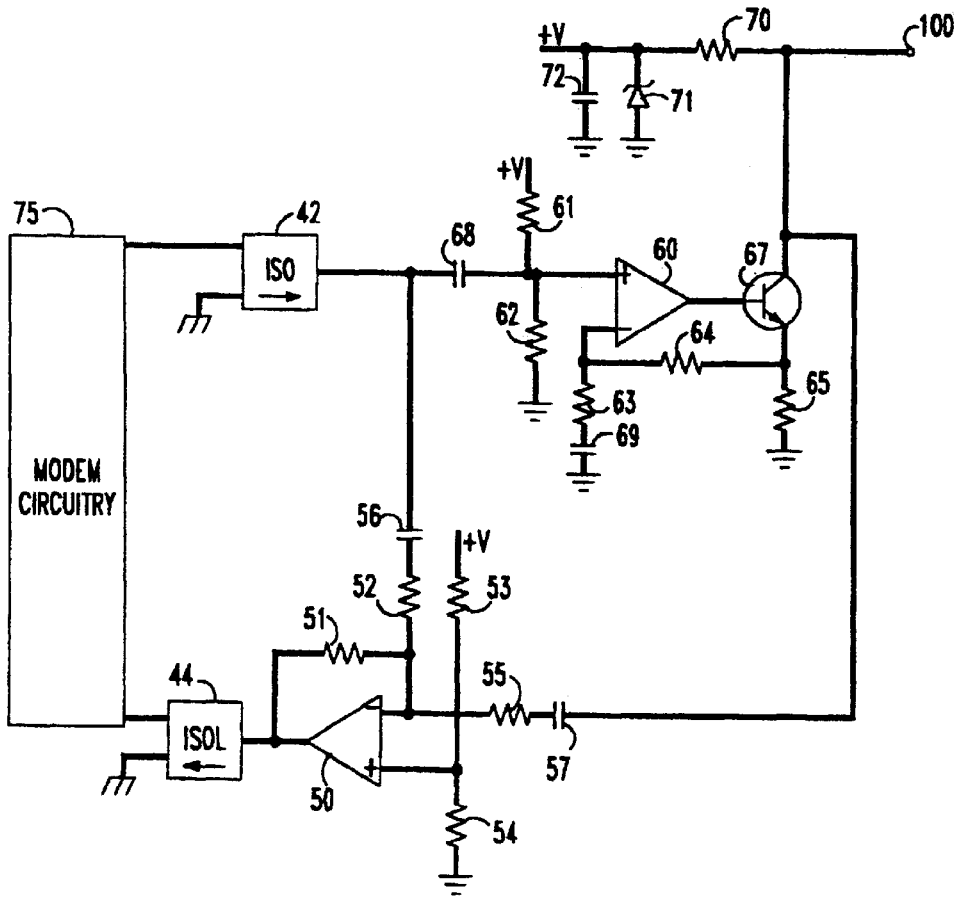

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 11 are determined to be patentable as amended.

Claims 2–10, dependent on an amended claim, are determined to be patentable.

1. A transformer-less hybrid circuit comprising:
   first means for deriving a dc operating power source from a signal applied to a first port of said hybrid by a distant communication means;
   second means, powered by said dc operating power source, for receiving an inbound signal transmitted to said hybrid by said distant communication means, [to develop] *said inbound signal to be combined in said hybrid with a transmit signal, said second means for developing* a received signal *from said inbound signal that is minus said transmit signal, the function of said hybrid being embodied on a single amplifier terminal, said inbound signal being supplied to said second means using only passive components*; and
   third means, powered by said dc operating power source, for applying a current to said distant communication means in proportion to an applied outbound signal, *said third means receiving said current from an isolated amplifier configured to provide an inverted transmit signal.*

11. A modem including a transformer-less hybrid circuit comprising:
    first means for deriving a dc operating power source from a signal applied to a first port of said hybrid by a distant communication means;
    second means, powered by said dc operating power source, for receiving an inbound signal transmitted to said hybrid by said distant communication means, [to develop] *said inbound signal to be combined in said hybrid with a transmit signal, said second means for developing* a received signal *that is minus said transmit signal, the function of said hybrid being embodied on a single amplifier terminal, said inbound signal being supplied to said second means using only passive components*; and
    third means, powered by said dc operating power source, for applying a current to said distant communication means in proportion to an applied outbound signal, *said third means receiving said current from an isolated amplifier configured to provide an inverted transmit signal.*

* * * * *